US008102565B2

(12) United States Patent
Fan et al.

(10) Patent No.: US 8,102,565 B2
(45) Date of Patent: Jan. 24, 2012

(54) IMAGE FORMING APPARATUS, IMAGE PROCESSING METHOD, AND COMPUTER-READABLE RECORDING MEDIUM

(75) Inventors: Yingying Fan, Tokyo (JP); Hideki Kubo, Kawasaki (JP); Shugo Higuchi, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 487 days.

(21) Appl. No.: 12/356,756

(22) Filed: Jan. 21, 2009

(65) Prior Publication Data

US 2009/0185199 A1 Jul. 23, 2009

(30) Foreign Application Priority Data

Jan. 22, 2008 (JP) ................................ 2008-011926

(51) Int. Cl.
*G06F 3/12* (2006.01)

(52) U.S. Cl. ............ 358/1.9; 358/406; 358/504; 399/49

(58) Field of Classification Search .................. 358/1.1, 358/1.9, 1.12, 1.16, 1.17, 1.18, 504; 399/49
See application file for complete search history.

(56) References Cited

U.S. PATENT DOCUMENTS

| | | | | |
|---|---|---|---|---|
| 6,538,770 | B1 * | 3/2003 | Mestha | 358/1.9 |
| 7,245,842 | B2 | 7/2007 | Hino | |
| 7,480,070 | B2 * | 1/2009 | Falk | 358/1.18 |
| 7,652,791 | B2 * | 1/2010 | McCarthy et al. | 358/504 |
| 2006/0152776 | A1 * | 7/2006 | Bailey | 358/504 |
| 2007/0268502 | A1 * | 11/2007 | McCarthy et al. | 358/1.9 |

* cited by examiner

*Primary Examiner* — Kimberly A Williams
(74) *Attorney, Agent, or Firm* — Canon U.S.A., Inc., IP Division

(57) ABSTRACT

An image forming apparatus is provided for performing image formation by developing an electrostatic latent image formed on an image bearing member using a recording material. The apparatus includes an input unit configured to input a color image to be formed, a specifying unit configured to specify an important color of the input color image, and a patch setting unit configured to set a patch on the basis of the important color. The apparatus also includes a calorimetric measurement unit configured to calorimetrically measure a developed patch obtained by developing an electrostatic latent image of the patch formed on the image bearing member, and a calibration unit configured to perform calibration on the basis of the calorimetric value obtained by the calorimetric measurement unit.

8 Claims, 6 Drawing Sheets

IMAGE FORMING APPARATUS, IMAGE PROCESSING METHOD, AND COMPUTER-READABLE RECORDING MEDIUM

BACKGROUND OF THE INVENTION

1. Field of the Invention

The present invention generally relates to an image forming apparatus, an image processing method, and a computer-readable recording medium.

2. Description of the Related Art

Image forming apparatuses employing an electrophotographic method generally have a lookup table (LUT) for converting an image signal into a signal value in accordance with an engine characteristic, so as to obtain a suitable density gradation characteristic. Such an image forming apparatus is, for example, a color copier or a color printer using toner of a plurality of colors. In the case of a color copier, the LUT is provided for each of C, M, Y, and K colors. The LUT is optimized for each of C, M, Y, and K colors to allow a desired full color image to be output.

However, the characteristic of the electrophotographic method is likely to change in accordance with a surrounding environment or a status of use. Therefore, under fixed image formation conditions, it can be difficult to constantly output images of stabilized tone or hue using the electrophotographic method.

In order to obtain a suitable gradation characteristic, a method of forming a patch on a photosensitive drum, detecting a development density using the patch, and controlling image formation conditions (e.g., performing calibration) using the detection result is used. More specifically, the correction of a γ correction LUT and the change in charging condition or development condition of a photosensitive drum on which an electrostatic latent image is formed are performed.

However, in the above-described image forming apparatus in the related art, the patch formed on an image bearing member such as the photosensitive drum is provided in advance. In this case, the patch is formed for a stabilized toner color that typically does not require correction. Accordingly, it can take a long processing time to correct a γ correction LUT (e.g., to perform calibration).

Since calibration is performed for any type of input image using the same patch, it is not always possible to obtain an appropriate calibration result.

As described previously, if a patch for calibration is a fixed patch, it can be the case that calibration may not be performed for an important color in an input image. For example, if it is assumed that the input image includes a logo and only the color of the logo is to be stabilized at the time of image formation, then in this case, calibration may be performed using a patch having a color different from the color of the logo, and thus the color of the logo may not be accurately reproduced.

SUMMARY OF THE INVENTION

In one embodiment of the invention, there is provided an image forming apparatus for performing image formation by developing an electrostatic latent image formed on an image bearing member using a recording material. The image forming apparatus includes an input unit configured to input a color image to be formed, a specifying unit configured to specify an important color of the input color image and a patch setting unit configured to set a patch on the basis of the important color. The image forming apparatus also includes a calorimetric measurement unit configured to calorimetrically measure a developed patch obtained by developing an electrostatic latent image of the patch formed on the image bearing member, and a calibration unit configured to perform calibration on the basis of the calorimetric value obtained by the calorimetric measurement unit.

Further features of the present invention will become apparent from the following description of exemplary embodiments with reference to the attached drawings.

DESCRIPTION OF THE EMBODIMENTS

Embodiments of the present invention will be described in detail below with reference to the accompanying drawings. Configurations to be described in the following embodiments are merely examples, and the present invention is not limited to these illustrated configurations.

Configuration of Image Forming Apparatus

An image forming apparatus according to a first embodiment of the present invention forms a latent image corresponding to an image information signal on an image bearing member, such as for example a photosensitive member or a dielectric, using at least one of an electrophotographic method, an electrostatic recording method, and the like, develops the formed latent image using a developing unit to form a visible image, directly or indirectly transfers the visible image onto a transfer medium such as a recording sheet, and fixes the transferred visible image on the transfer medium using a fixing unit to obtain a permanent image. In this embodiment, descriptions will be made using an image forming apparatus illustrated in FIGS. 1 and 2 by way of example.

Figure 1:
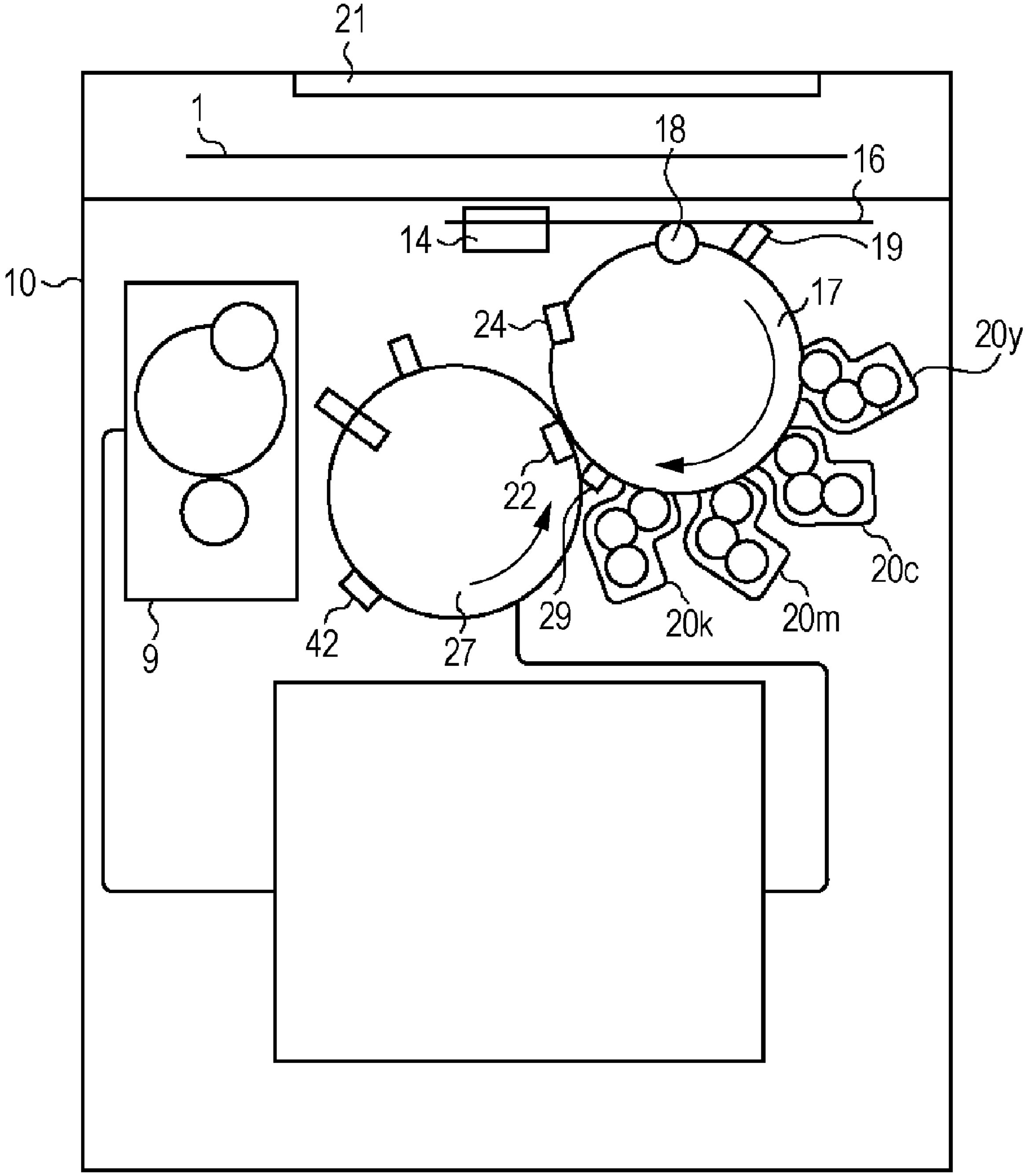
FIG. 1 is a sectional side view of an image forming apparatus according to an embodiment of the present invention.
Figure 2:
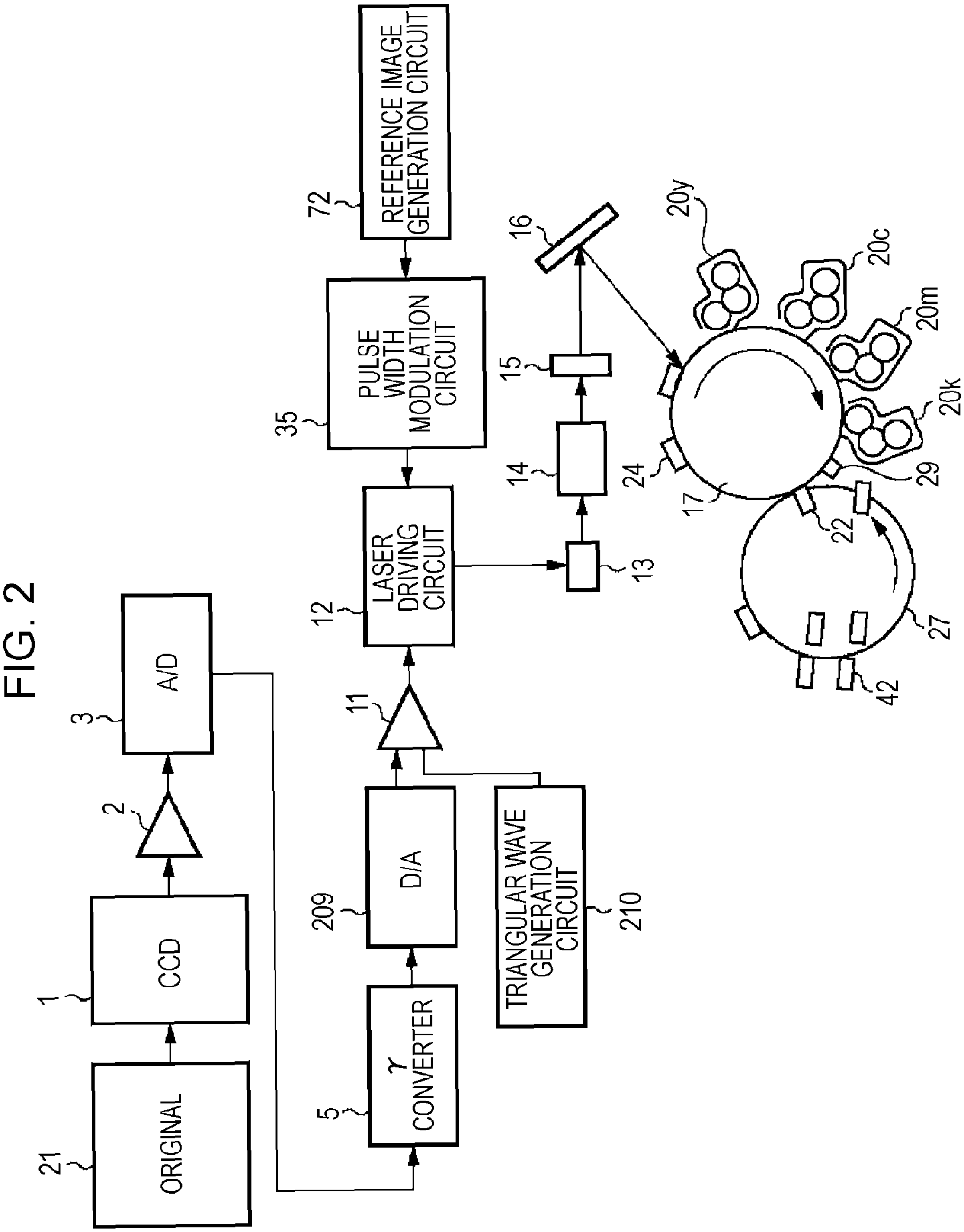
FIG. 2 is a block diagram illustrating a functional configuration of an image forming apparatus according to an embodiment of the present invention.

FIG. 1 is a sectional side view of an image forming apparatus according to this embodiment. FIG. 2 is a block diagram illustrating a configuration of the image forming apparatus illustrated in FIG. 1. In FIGS. 1 and 2, the same reference numeral is used to denote the same component.

In an image forming apparatus according to this embodiment, an image of an original 21 to be copied is read by a CCD 1 using an imaging lens. The CCD 1 divides the image into a large number of pixels and generates a photoelectric conversion signal corresponding to the color value of each of the pixels. An analog image signal output from the CCD 1 is amplified to a predetermined level by an amplifier 2, and is then converted into, for example, an 8-bit digital image signal by an analog/digital converter 3.

According to the embodiment as shown, the digital image signal is supplied to an optimized γ converter 5, is converted into an analog image signal by a digital/analog converter 209, and is then supplied to one of input terminals of a comparator 11. A triangular wave signal having a predetermined signal cycle is generated from a triangular wave generation circuit 210 and is then supplied to the other one of the input terminals of the comparator 11. The analog image signal supplied to one of the input terminals of the comparator 11 is compared with the triangular wave signal for pulse width modulation.

The analog image signal that has been subjected to the pulse width modulation is input into a laser driving circuit 12. In the laser driving circuit 12, a laser driving pulse having a pulse width corresponding to the pulse width of the analog image signal is formed. Thus, a laser driving pulse is formed for each pixel. The formed laser driving pulse is supplied to a semiconductor laser 13 so as to cause the semiconductor laser 13 to emit a laser beam for a period of time corresponding to the pulse width of the laser driving pulse. The laser beam emitted from the semiconductor laser 13 is scanned by a polygonal mirror 14 in a main scanning direction, is applied through lenses 15 and 16 onto a photoconductive drum 17 that is rotating in a direction denoted by an arrow in FIGS. 1 and 2. An electrostatic latent image may be thus formed on the photoconductive drum 17.

On the other hand, after the photoconductive drum 17 has been uniformly discharged by an exposure device 18, the photoconductive drum 17 is uniformly charged, for example, negatively charged by a primary charger 19. Subsequently, the photoconductive drum 17 is exposed to the laser beam, so that an electrostatic latent image is formed on the photoconductive drum 17 in accordance with the image signal. The electrostatic latent image is developed by developing devices 20*y*, 20*c*, 20*m*, and 20*k* containing recording materials (e.g., toner) of corresponding colors, so that a toner image is formed. A DC bias component corresponding to an electrostatic latent image forming condition and an AC bias component for improving a developing efficiency are superimposed, and are then applied to each of the developing devices 20*y*, 20*c*, 20*m*, and 20*k*.

According to the embodiment as shown, the toner image formed on the photoconductive drum 17 is held on a transfer drum 27 that is driven to rotate in a direction represented by an arrow in FIGS. 1 and 2, and is then transferred onto a recording sheet (not illustrated) under an action of a transfer charger 22. The toner remaining on the photoconductive drum 17 is scraped off and collected by a photosensitive member cleaner 24.

Near the rim of the transfer drum 27, a transfer cleaner 42 for removing toner remaining on the transfer drum 27 is disposed. Referring to FIG. 1, a fixing device 9 and a paper output tray 10 are illustrated.

In this embodiment, a patch sensor 29 is disposed for correcting a toner density that has been changed at the time of development performed in each of the developing devices 20*y*, 20*c*, 20*m*, and 20*k*. That is, a patchy reference toner image (hereinafter merely referred to as a patch) obtained by developing the electrostatic latent image formed using a density control image signal on the photoconductive drum 17 is calorimetrically measured by the patch sensor 29. A patch calorimetric measurement process performed by the patch sensor 29 will be described later.

In an electrophotographic image forming apparatus according to this embodiment, the γ characteristic of an image density may change in accordance with, for example, the surrounding environment, the number of copies, or the like. In a color image, the change in γ characteristic may appear as a change in tone or hue or a gradation variation in a highlighted portion, and may become a destabilizing factor of image formation. In order to obtain a suitable gradation characteristic, a method of forming a predetermined patch on the photoconductive drum 17, calorimetrically measuring the patch using the patch sensor 29, and correcting a γ correction LUT included in the γ converter 5 using a calorimetric value that is the result of the calorimetric measurement (that is, performing calibration), is performed.

Examples of the usefulness of the γ correction LUT will be briefly described. For example, in the case of an apparatus for forming a halftone multivalued image, a halftone image may not be formed only by causing an exposure device included in the apparatus to switch on/off exposure. For example, a halftone multivalued image may be formed by performing exposure intensity modulation or exposure time modulation in accordance with an input multivalued image signal or by using a dither pattern. In such a multivalued image forming apparatus, a suitable density gradation characteristic can be obtained by controlling a halftone density characteristic. In one version, a relationship between an input signal and output density gradation (γ) may be linear. However, it may also be the case that, due to the characteristic of an electrophotographic method, the relationship between them becomes non-linear. According to one aspect, in order to achieve the linear relationship between an input signal and output density gradation, a signal input into an exposure device may be corrected and converted using a γ correction LUT.

Patch Colorimetric Measurement Process

An image forming apparatus according to this embodiment is provided with a reference image generation circuit 72 for generating a reference image signal having a signal level corresponding to a predetermined color value, as shown for example in the embodiment of FIG. 2. A reference image signal output from the reference image generation circuit 72 is supplied to a pulse width modulation circuit 35, so that a laser driving pulse having a pulse width corresponding to a predetermined color value is generated. The laser driving pulse is supplied to the semiconductor laser 13. The semiconductor laser 13 emits light in accordance with the pulse width to scan the photoconductive drum 17. As a result, a reference electrostatic latent image corresponding to a color value specified by the reference image generation circuit 72 is developed by the developing devices 20*y*, 20*c*, 20*m*, and 20*k*, so that a patch is obtained. The patch is calorimetrically measured by the patch sensor 29.

Figure 3:
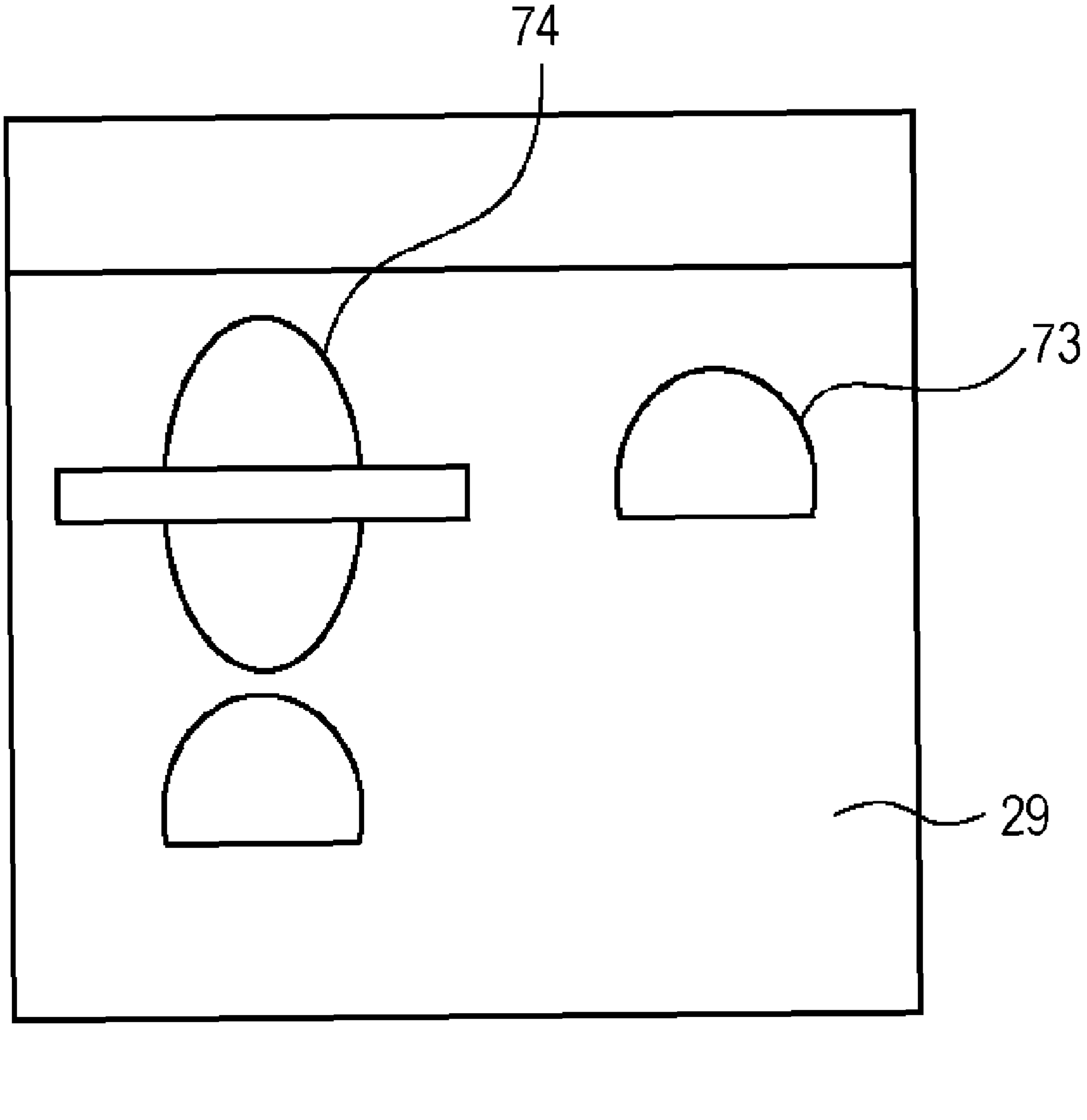
FIG. 3 is a diagram illustrating a configuration of a patch sensor according to an embodiment of the present invention.

FIG. 3 illustrates an embodiment of a configuration of the patch sensor 29. Referring to FIG. 3, the patch sensor 29 includes a light-emitting portion 73 including a light source such as an LED, and a light-receiving portion 74 including a photoelectric conversion element. Light is emitted from the light-emitting portion 73 to a patch formed on the photoconductive drum 17, and light reflected from the patch is received by the photoelectric conversion element included in the light-receiving portion 74. A signal output from the photoelectric conversion element can be associated with a color value of the patch using a prepared transformation equation based on the relationship between a detected voltage and an image color value.

According to one embodiment, using the calorimetric value of the patch detected by the patch sensor 29, as described previously, the calibration of a γ correction LUT may be performed. In this embodiment, in order to perform calibration in the middle of generation of a large number of images, a patch may be formed on the photoconductive drum 17 at the same time of generation of an image to be transferred to a recording sheet. Since the photoconductive drum 17 can bear a plurality of images, a patch may be formed in an area between formed images (e.g., sheets). Accordingly, in this embodiment, a patch is also referred to as a patch between sheets. A calorimetric value obtained by the patch sensor 29 may also be used for another purpose. For example, by referring to a LUT describing the relationship between a calorimetric value of a patch and an amount of toner supply, an appropriate amount of toner may be supplied to each of the developing devices 20*y*, 20*c*, 20*m*, and 20*k*.

Calibration

Figure 4:
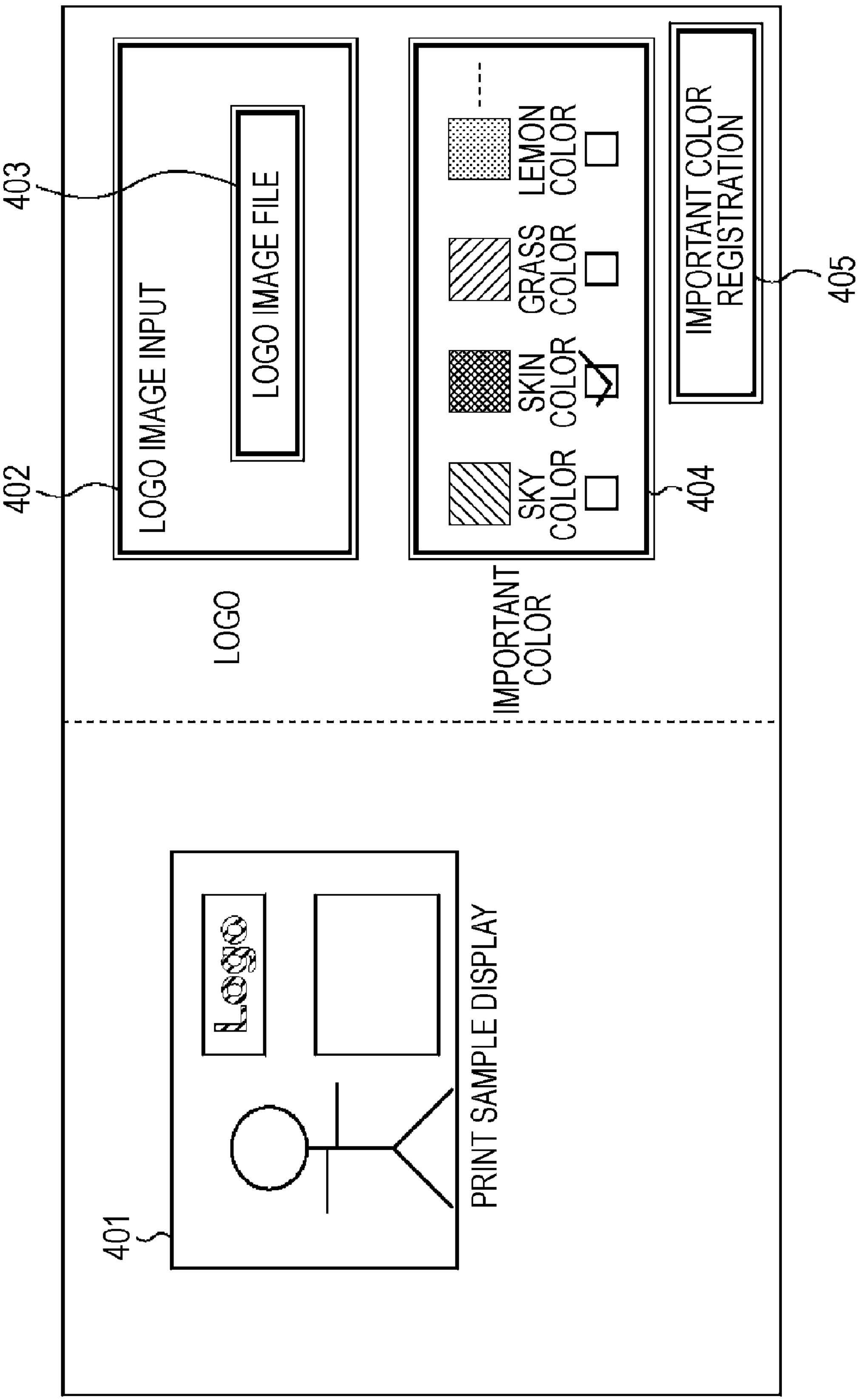
FIG. 4 is a diagram illustrating an example of a UI for patch setting according to an embodiment of the present invention.

An example of a calibration process according to this embodiment will be described below. In an image forming apparatus according to this embodiment, a user may specify an important color of a formed image using an interface (hereinafter referred to as a UI), an example of which is illustrated in FIG. 4. As described previously, a patch may be formed on an image bearing member such as the photoconductive drum 17 on the basis of the specified important color, and calibration may be performed.

An example of a UI for patch setting according to this embodiment will be described with reference to FIG. 4. A user refers to a sample image 401 input as an image to be formed so as to specify the most important color of the sample image for calibration.

The following three methods are examples of methods of specifying an important color for which accurate calibration may be required using the UI illustrated in FIG. 4.

Figure 5:
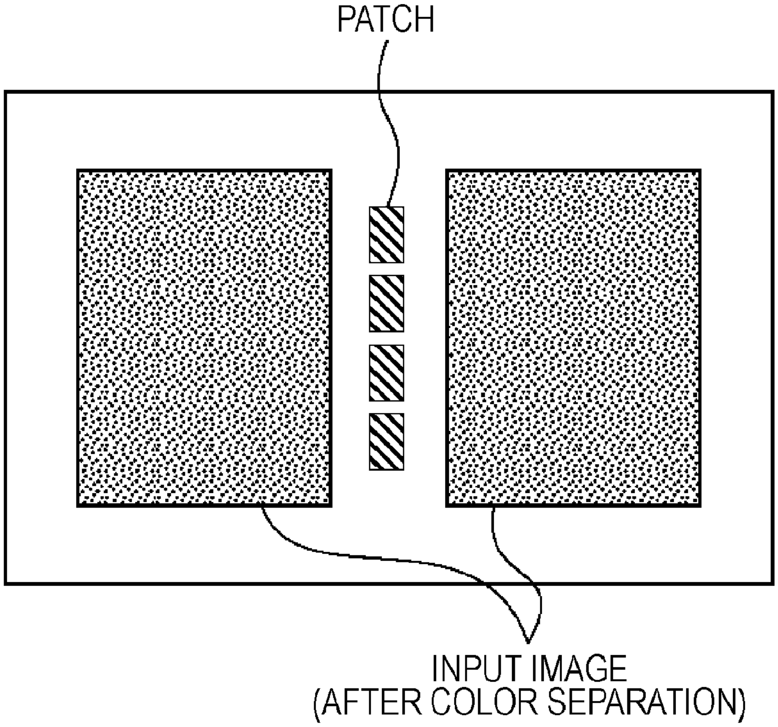
FIG. 5 is a diagram illustrating an example of a patch according to an embodiment of the present invention.

A first example method is a method of specifying a single logo color. In this case, in the UI illustrated in FIG. 4, a logo image input portion 402 is selected. As a result, a logo color is specified as an important color. An image forming apparatus detects the color of a logo area from an input image corresponding to the sample image 401, and creates a patch for calibration using only a logo color as illustrated in FIG. 5. Since a method of detecting a logo area from an image is known, the description thereof will be omitted. The logo image input portion 402 includes a logo image file button 403. By pressing the logo image file button 403, a user can specify a specific logo image prepared in advance without referring to the input image.

Figure 6:
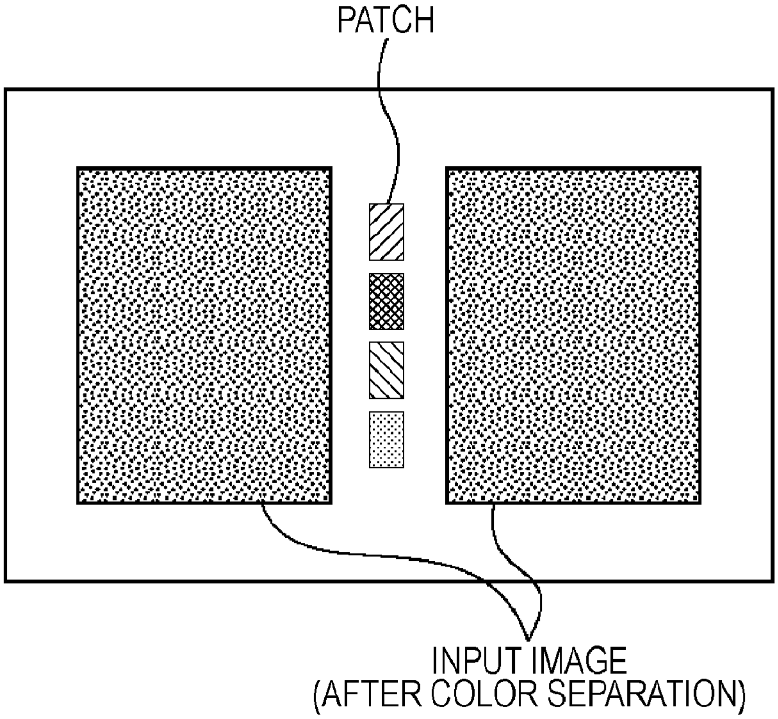
FIG. 6 is a diagram illustrating an example of a patch according to an embodiment of the present invention.

A second example method is a method of selecting and specifying an important color. In this case, a user selects one of a plurality of important color candidates displayed in an important color selection portion 404 illustrated in FIG. 4, and marks a corresponding checkbox so as to specify the important color. These important color candidates displayed in the important color selection portion 404 may be determined in such a manner that colors may be automatically extracted from the sample image 401, and some of these extracted colors may be set as the important color candidates in accordance with the frequency of use. In one version, a specific color (for example, a human skin color) may be registered in advance as an important color candidate. If the important color is specified as described previously, a patch for calibration may be created so that the patch includes a high proportion of the specified important color as illustrated in, for example, FIG. 6. As a method of specifying an important color and creating a patch on the basis of the specified important color, any method enabling important-color-oriented calibration may be used. For example, a patch may be created using colors in a predetermined color range centered on an important color, that is, a patch may be created so that the patch includes a high proportion of colors near the important color. As an important color, a single color or a plurality of colors may be selected. In one version, a patch may be created in accordance with the number of selected colors.

A third example method is a method of performing new registration of an important color. It is assumed that the color of a certain specific object (e.g., an important product) included in the sample image 401 is not extracted as an important color, but rather may require accurate calibration. In this case, since the specific color is may not be displayed as a candidate to be selected in the important color selection portion 404, a user may not be able to select the specific color as an important color. Accordingly, in one version, by pressing the important color registration button 405, the user may be able to register the specific color as an important color. Although various color registration methods can be considered, a particular color registration method is not specified in this embodiment. For example, a user may designate a specific color area using a cursor on the sample image 401, and press the important color registration button 405. As a result, the designated specific color is registered as an important color, and is then displayed in the important color selection portion 404. The user may therefore be able to select the registered specific color as an important color.

As described previously, in this embodiment, an important color in a color image to be formed can be selected using the UI illustrated in the example shown in FIG. 4 in accordance with a user's instruction.

Figure 7:
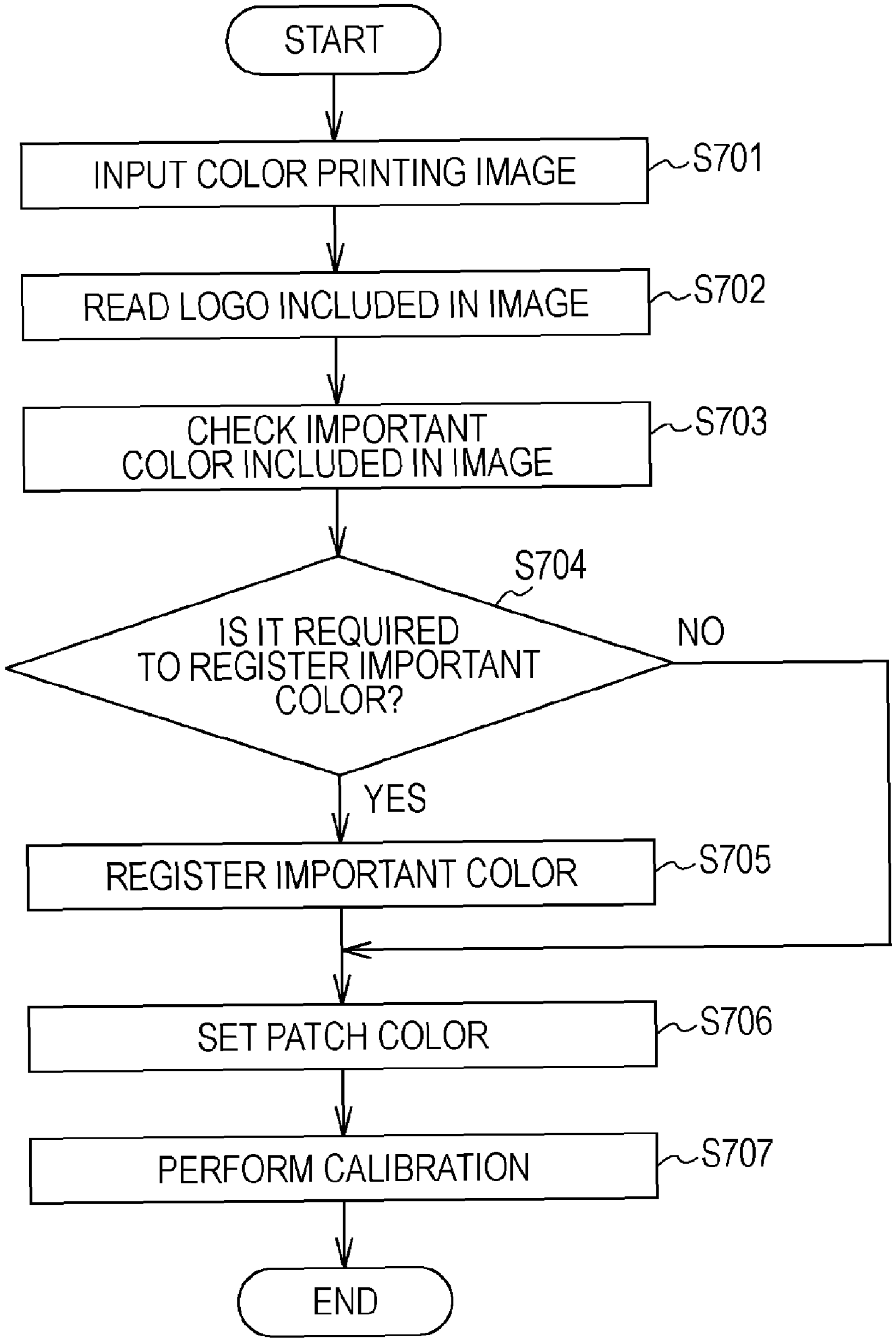
FIG. 7 is a flowchart illustrating a calibration process according to an embodiment of the present invention.

FIG. 7 is a flowchart illustrating a calibration process according to this embodiment.

First, in step S701, an image that will be subjected to color image formation is input. The input image is displayed as, for example, the sample image 401 illustrated in FIG. 4. In step S702, if there is a logo in the input image, the logo is read out. Subsequently, if the logo image input portion 402, as illustrated for example in FIG. 4 is selected, the color of the read logo is set as an important color.

In step S703, important color candidates are extracted from the input image. The extracted important color candidates are displayed in the important color selection portion 404, as illustrated for example in FIG. 4.

In step S704, it is determined whether another important color may be required to be registered. The determination processing may be performed on the basis of the result of determination whether the important color registration button 405 has been pressed in, for example, the UI illustrated in FIG. 4. If it is required to register another important color (YES in STEP S704), processing proceeds to step S705 where the above-described registration of an important color is performed. If it is not required to register another important color (NO in step S704), the process proceeds to step S706.

In the above-described process embodiment, colors may be obtained as the important color candidates in steps S702, S703, and S705, and the specification of an important color can be performed using the example of the UI illustrated in FIG. 4. As described previously, if an important color is specified using the example of the UI illustrated in FIG. 4, the process proceeds to step S706, in which the color of a patch is set on the basis of the specified important color. In step S707, calibration is performed using the patch set in step S706, after which the process is ended. Consequently, with respect to an important color, fairly accurate calibration may be performed and fairly accurate color reproducibility can be obtained.

As described previously, according aspects of this embodiment, a patch including a relatively high proportion of an important color desired by a user in an input image is formed, whereby relatively accurate calibration can be performed with respect to the important color. As a result, image formation may be performed using relatively accurate color reproducibility of the important color. Accordingly, aspects of the present invention may provide an image forming apparatus and an image forming method capable of performing relatively accurate calibration for a specific color designated by a user.

In other embodiments of the invention, for example, the present invention can adopt embodiments in the form of a system, an apparatus, a method, a program, a storage medium (recording medium), and the like. For example, the present invention may be applied to a system comprising a plurality of devices (for example, one or more of a host computer, an interface apparatus, an image capturing apparatus, a web application, etc.), or to an apparatus comprising a single device.

In one embodiment, aspects of the present invention may be achieved in such a manner that a computer readable storage medium having computer-executable instructions, such as a program of software, for implementing the functions of the above-described embodiment is directly or remotely supplied to a system or an apparatus, and a computer of the system or apparatus reads out the supplied computer-executable instructions and executes the instructions. The computer-executable instructions in this case may be instructions corresponding to the flowcharts illustrated in the drawings for the above-described embodiment.

Accordingly, a computer readable storage medium containing the computer-executable instructions that is itself installed on or otherwise provided to a computer so as to cause the computer to achieve the functional processing of the present invention may realize aspects of the present invention. That is, aspects of the present invention may also include a computer readable storage medium itself having computer-executable instructions for implementing the functional processing of the present invention.

In this case, the computer-executable instructions may include those embodied in a computer program, an object code, a program executed by an interpreter, or script data provided for an OS.

The computer readable storage medium can include recording media for providing the computer-executable instructions, which may include, for example, one or more of a floppy (registered trademark) disk, a hard disk, an optical disc, a magneto-optical disk, an MO, a CD-ROM, a CD-R, a CD-RW, a magnetic tape, a nonvolatile memory card, a ROM, and a DVD (e.g., DVD-ROM or DVD-R).

In one embodiment, computer-executable instructions may be provided by connecting a client computer to an Internet home page via the browser of the client computer, and downloading from the home page to a storage medium, such as for example a hard disk, a computer program having the computer-executable instructions in accordance with aspects of the present invention (or a compressed file with an automatic installing function). In another embodiment, a program having the computer-executable instructions may also be provided in such a manner that a program code having the computer-executable instructions in accordance with aspects of the present invention is divided into a plurality of files, and the files are individually downloaded from different home pages. That is, embodiments of the present invention may also include a WWW server that allows a plurality of users to download program files for implementing the functional processing of the present invention in a computer.

In yet another embodiment, the computer-executable instructions of the present invention may be encrypted, stored in a storage medium such as a CD-ROM, and distributed to users. In one version, a user who satisfies predetermined conditions may be allowed to download decryption key information from a home page via the Internet. That is, the user may use the key information to execute the encrypted instructions and install a program having the instructions on a computer.

The computer may execute the read instructions to achieve functions of the above-described embodiment. Furthermore, an OS or the like running on the computer may perform part or all of actual processing under the instructions to achieve functions of the above-described embodiment.

Still furthermore, in one embodiment, the instructions read out from the recording medium may be written to a memory provided in a function expansion board inserted into the computer, or in a function expansion unit connected to the computer. Subsequently, the instructions may be executed to achieve functions of the above-described embodiment. That is, a CPU or the like provided in the function expansion board or the function expansion unit may perform part or all of actual processing under the instructions.

While the present invention has been described with reference to exemplary embodiments, it is to be understood that the invention is not limited to only the exemplary embodiments disclosed herein. The scope of the following claims is to be accorded the broadest interpretation so as to encompass all modifications and equivalent structures and functions.

This application claims the benefit of Japanese Application No. 2008-011926 filed Jan. 22, 2008, which is hereby incorporated by reference herein in its entirety.

What is claimed is:

1. An image forming apparatus for performing image formation by developing an electrostatic latent image formed on an image bearing member using a recording material, the image forming apparatus comprising:

- an input unit configured to input a color image to be formed;
- a specifying unit configured to specify a plurality of important color candidates of the input color image by extracting from the input color image in accordance with a frequency of use of colors;
- a providing unit configured to provide a user interface to select an important color from the specified important color candidates;
- a patch setting unit configured to set a patch on the basis of the selected important color;
- a colorimetric measurement unit configured to colorimetrically measure a developed patch obtained by developing an electrostatic latent image of the patch formed on the image bearing member; and
- a calibration unit configured to perform calibration on the basis of a colorimetric value obtained by the colorimetric measurement unit.

2. The image forming apparatus according to claim 1, further comprising a designation unit configured to designate a color of a logo image set in advance in accordance with a user's instruction, and

- wherein the specifying unit specifies the color of the logo image designated by the designation unit as the important color.

3. The image forming apparatus according to claim 2, wherein the patch setting unit sets the patch so that the patch includes a high proportion of the important color.

4. The image forming apparatus according to claim 2, wherein the patch setting unit sets the patch using only the important color.

5. The image forming apparatus according to claim 1, further comprising a storage unit configured to store in advance a plurality of colors as the important color candidates, and

- wherein the specifying unit selects at least one of the important color candidates stored in the storage unit in accordance with a user's instruction and specifies the selected important color candidate as the important color.

6. The image forming apparatus according to claim 5, further comprising a registration unit configured to register a color of the color image selected in accordance with a user's instruction in the storage unit as the important color candidate.

7. An image processing method for performing image formation by developing an electrostatic latent image formed on an image bearing member using a recording material, the method comprising:

using at least one processor to perform the following:

inputting a color image to be formed;

specifying a plurality of important color candidates of the input color image by extracting from the input color image in accordance with a frequency of use of colors;

providing a user interface to select an important color from the specified important color candidates;

setting a patch on the basis of the selected important color;

forming and developing the patch on the image bearing member and colorimetrically measuring the developed patch; and performing calibration on the basis of a colorimetric value obtained in the colorimetric measurement.

8. A non-transitory computer-readable recording medium containing computer-executable instructions for controlling an image forming apparatus to perform image formation by developing an electrostatic latent image formed on an image bearing member using a recording material, the computer-readable recording medium comprising:

computer-executable instructions for inputting a color image to be formed;

computer-executable instructions for specifying a plurality of important color candidates of the input color image by extracting from the input color image in accordance with a frequency of use of colors;

computer-executable instructions for providing a user interface to select an important color from the specified important color candidates;

computer-executable instructions for setting a patch on the basis of the selected important color;

computer-executable instructions for forming and developing the patch on the image bearing member and colorimetrically measuring the developed patch; and computer-executable instructions for performing calibration on the basis of a colorimetric value obtained in the colorimetric measurement.

* * * * *